US011131551B2

(12) United States Patent
Fujimoto

(10) Patent No.: US 11,131,551 B2
(45) Date of Patent: Sep. 28, 2021

(54) MAP DATA PROVIDING SYSTEM USING COORDINATE TRANSFORMATION AND REFERENCE POINTS

(71) Applicant: DENSO CORPORATION, Kariya (JP)

(72) Inventor: Hidetoshi Fujimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 212 days.

(21) Appl. No.: 16/406,066

(22) Filed: May 8, 2019

(65) Prior Publication Data

US 2019/0265050 A1 Aug. 29, 2019

Related U.S. Application Data

(63) Continuation of application No. PCT/JP2017/033622, filed on Sep. 18, 2017.

(30) Foreign Application Priority Data

Nov. 18, 2016 (JP) .............................. JP2016-224783

(51) Int. Cl.
G01C 21/32 (2006.01)
G09B 29/00 (2006.01)
G09B 29/10 (2006.01)

(52) U.S. Cl.
CPC ............. *G01C 21/32* (2013.01); *G09B 29/00* (2013.01); *G09B 29/10* (2013.01)

(58) Field of Classification Search
CPC ......... G01C 21/32; G09B 29/00; G09B 29/10
See application file for complete search history.

(56) References Cited

U.S. PATENT DOCUMENTS

| 6,335,695 | B1 | 1/2002 | Kawasaki |
| 10,584,971 | B1 * | 3/2020 | Askeland ............... G01C 21/30 |
| 2007/0271036 | A1 * | 11/2007 | Atarashi ................ G01C 21/32 |
| | | | 701/446 |
| 2010/0042651 | A1 | 2/2010 | Nakamura et al. |

(Continued)

FOREIGN PATENT DOCUMENTS

| JP | H11212449 A | 8/1999 |
| JP | 3473510 B2 | 12/2003 |

(Continued)

*Primary Examiner* — James J Lee
*Assistant Examiner* — Alexander George Matta
(74) *Attorney, Agent, or Firm* — Harness, Dickey & Pierce, P.L.C.

(57) ABSTRACT

A map data providing system stores map data including multiple section data in which a reference point indicated by absolute coordinates is set for each of multiple sections, and a map element is represented by relative coordinates to the reference point of the section to which the map element belongs, detects position coordinates of the vehicle based on a navigation signal, employs a difference between absolute coordinates of the map element indicated by the map data and absolute coordinates of the map element identified based on the relative position of the map element and the position coordinates of the vehicle as a deviation amount, calculates a correction amount based on the deviation amount, corrects the position information of the reference point by using the correction amount, and creates corrected map data indicating position coordinates of the map element.

8 Claims, 8 Drawing Sheets

(56) References Cited

U.S. PATENT DOCUMENTS

| | | | |
|---|---|---|---|
| 2012/0320425 A1* | 12/2012 | Yoshida | G09B 29/10 |
| | | | 358/1.18 |
| 2016/0054133 A1 | 2/2016 | Mizuno et al. | |
| 2016/0161265 A1* | 6/2016 | Bagheri | G01S 13/89 |
| | | | 701/450 |

FOREIGN PATENT DOCUMENTS

| | | | |
|---|---|---|---|
| JP | 2005266627 A | 9/2005 | |
| JP | 2007310198 A | 11/2007 | |
| JP | 4556820 B2 | 10/2010 | |
| JP | 4682088 B2 | 5/2011 | |
| JP | 5018458 B2 | 9/2012 | |
| JP | 5252855 B2 | 7/2013 | |
| JP | 2014126537 A | 7/2014 | |
| JP | 2014211557 A | 11/2014 | |
| JP | 2015082045 A | 4/2015 | |
| JP | 5813181 B1 | 11/2015 | |

* cited by examiner

MAP DATA PROVIDING SYSTEM USING COORDINATE TRANSFORMATION AND REFERENCE POINTS

CROSS REFERENCE TO RELATED APPLICATIONS

The present application is a continuation application of International Patent Application No. PCT/JP2017/033622 filed on Sep. 18, 2017, which designated the United States and claims the benefit of priority from Japanese Patent Application No. 2016-224783 filed on Nov. 18, 2016. The entire disclosures of all of the above applications are incorporated herein by reference.

TECHNICAL FIELD

The present disclosure relates to a map data providing system.

BACKGROUND

Conventionally, there has been proposed a map data providing system in which map data included in a navigation device can be updated to map data reflecting a changed portion such as a connection relationship of roads at any time by performing a communication between a center and the navigation device.

SUMMARY

The present disclosure provides a map data providing system that stores map data including multiple section data in which a reference point indicated by absolute coordinates is set for each of multiple sections, and a map element is represented by relative coordinates to the reference point of the section to which the map element belongs, detects position coordinates of the vehicle based on a navigation signal, employs a difference between absolute coordinates of the map element indicated by the map data and absolute coordinates of the map element identified based on the relative position of the map element and the position coordinates of the vehicle as a deviation amount, calculates a correction amount calculated based on the deviation amount, correct the position information of the reference point by using the correction amount, and create corrected map data indicating position coordinates of the map element.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
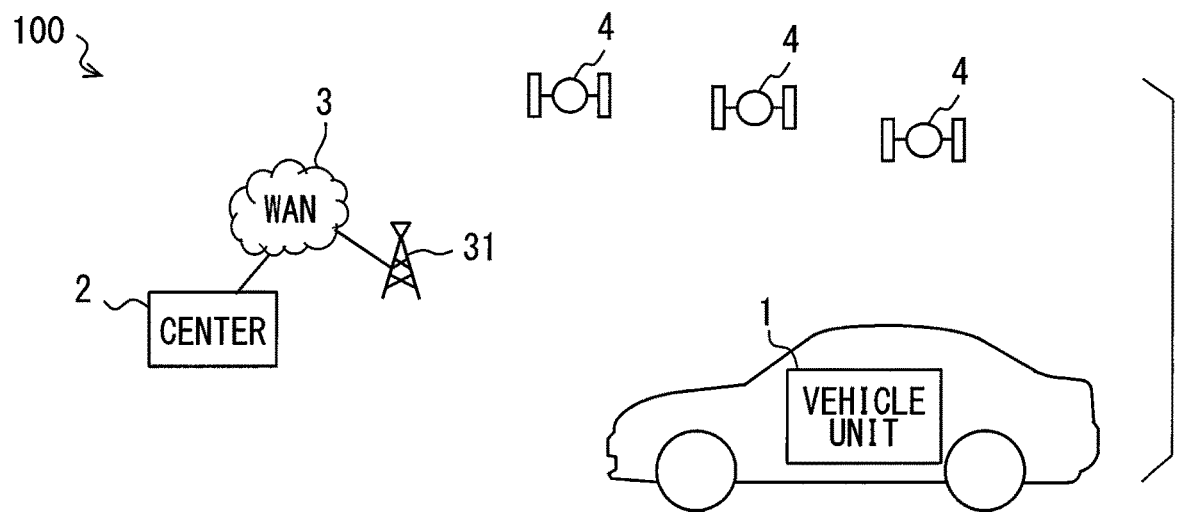
FIG. 1 is a diagram showing a schematic configuration of a map data providing system according to an embodiment of the present disclosure.

In some map data providing systems, an administrator of map data (for example, a map creator) creates map data that reflects a changed portion of a road network or a facility in a predetermined cycle. A center distributes difference map data representing a difference between the map data of an old version and the map data of a new version to a vehicle navigation device. The navigation device can use the map data describing the latest road network and facility information by combining the difference map data with the map data held by the navigation device.

However, as position coordinates of each point indicated by the map data, a result of a first survey or a result of a re-survey at a predetermined timing is used. As a technique for matching the result of the re-survey with original map data or map data of other areas, for example, a semi-dynamic correction has been known.

In recent years, a self-driving technique using high precision map data has been put into practical use. The high precision map data is map data in which not only connection relationships of road networks, road shapes, and position information of intersections, but also lane markings, pause lines, traffic lights, traffic signs, and the like are provided as map elements, and the position coordinates of those map elements are indicated with precision in units of centimeters. An electronic control device providing the self-driving function recognizes an environment around a subject vehicle on the basis of the high precision map data and the position coordinates of the subject vehicle detected with the use of a GNSS (Global Navigation Satellite System), and controls the traveling of the vehicle on the basis of the recognized result.

The position coordinates of each point on a ground surface change over time due to a crustal movement. For example, in Japan, the crust moves by an average of several centimeters per year. In North America and Europe, the crust moves about 3 to 5 cm per year. Thus, if the position coordinates of a map element registered in the map data are not updated, an error between the position coordinates of each point shown in the map data and actual position coordinates increases according to an elapsed time from the time of creation of the map data.

In a case where a map data is supposed to be used for a route guidance process, a deviation between position coordinates of each point shown in the map data and actual position coordinates is allowed to some extent (for example, about 10 meters). However, an allowable range of the error required for the map data to be subjected to self-driving or the like is set to be less than 25 cm. In recent years, positioning accuracy by the GNSS has been improved. However, even if the positioning accuracy has been improved, if the map data includes the error, it is difficult to utilize highly accurate positioning results.

In order to maintain a state in which the error between the position coordinates of each map element shown in the map data and the actual position coordinates falls within a predetermined allowable range more severe than the case where the map data is supposed to be used for the route guidance process, there is a need to perform re-survey every several years and correct (in other words, re-arrange) the position coordinate data of all the map elements. However, in order to rearrange the position coordinates of all the map elements in the map data, the costs of surveying work, data update, and the like are required.

A map data providing system according to an aspect of the present disclosure includes: a vehicle unit that is configured to be used with being mounted on a vehicle and includes a map data storage that stores map data including a plurality of pieces of section data indicating position information of map elements existing in a map recording area with dividing the map recording area into a plurality of sections, in which a reference point is set in each of the plurality of sections, position information of the reference point is represented by absolute coordinates, and the position information of each of the map elements is represented by relative coordinates indicating a relative position to the reference point set in the section to which each of the map elements belongs, a vehicle position detector that detects position coordinates of the vehicle upon receiving a navigation signal transmitted by a positioning satellite, a surrounding area map data acquisition unit that reads traveling section data which is the section data of the section in which the vehicle exists based on the position coordinates detected by the vehicle position detector, and acquires surrounding area map data which is data indicating the position coordinates of the map elements existing around the vehicle based on the position information of the reference point set in the traveling section which is the section in which the vehicle exists and the relative coordinates of each of the map elements indicated by the traveling section data, and a deviation amount identification unit that identifies a deviation amount indicating a difference between a position of each of the map elements indicated in the traveling section data and a position at which each of the map elements actually exists, based on the position coordinates detected by the vehicle position detector; a correction amount calculation unit that calculates a correction amount for adjusting the coordinates of the reference point indicated in the traveling section data to an actual position based on the deviation amount identified by the deviation amount identification unit; and a corrected map creation unit that corrects the position information of the reference point by using the correction amount determined by the correction amount calculation unit, and creates corrected map data indicating the position coordinates of each of the map elements by using the corrected position information of the reference point and the relative coordinates of each of the map elements.

According to the above configuration, the map data in which the error between the actual position coordinates and the position coordinates shown in the map data is reduced can be provided at low costs.

A map data providing system according to another aspect includes a vehicle unit configured to be mounted in a vehicle and including a map data storage and a vehicle-side controller. The map data storage stores map data including a plurality of pieces of section data indicating position information of a plurality of map elements existing in a map recording area with dividing the map recording area into a plurality of sections in which the map elements include an on-road installed object, which is an object installed on a road, a reference point is set in each of the sections, position information of the reference point is represented by absolute coordinates, and the position information of each of the map elements is represented by relative coordinates indicating a relative position to the reference point set in the section to which each of the map elements belongs. The vehicle-side controller includes a processor and a memory storing a vehicle program. The vehicle program instructs the processor to detect position coordinates of the vehicle upon receiving a navigation signal transmitted by a positioning satellite, read traveling section data which is the section data of the section in which the vehicle exists based on the position coordinates, acquire surrounding area map data which is data indicating the position coordinates of the map elements existing around the vehicle based on the position information of the reference point set in a traveling section which is the section in which the vehicle exists and the relative coordinates of each of the map elements indicated by the traveling section data, acquire a detection result of a surrounding monitoring system mounted on the vehicle, detect the on-road installed object existing in a surrounding of the vehicle and identify a relative position of a detected object, which is the detected on-road installed object, to the vehicle, identify absolute coordinates of the detected object based on the relative position of the detected object and the position coordinates of the vehicle, identify absolute coordinates of the detected object indicated by the map data based on the surrounding area map data, employ a difference between the absolute coordinates of the detected object indicated by the map data and the absolute coordinates of the detected object identified based on the relative position of the detected object and the position coordinates of the vehicle as a deviation amount, calculate a correction amount for adjusting the coordinates of the reference point indicated in the traveling section data to an actual position based on the deviation amount, and correct the position information of the reference point by using the correction amount, and create corrected map data indicating the position coordinates of each of the map elements by using the corrected position information of the reference point and the relative coordinates of each of the map elements.

A map data providing system according to another aspect of the present disclosure includes a vehicle unit that is configured to be mounted in a vehicle and includes a map data storage and a vehicle-side controller, and a center that communicates with the vehicle unit through a wide area communication network and includes a center-side controller. The map data storage stores map data including a plurality of pieces of section data indicating position information of map elements existing in a map recording area with dividing the map recording area into a plurality of sections in which the map elements include an on-road installed object, which is an object installed on a road, a reference point is set in each of the plurality of sections, position information of the reference point is represented by absolute coordinates, and the position information of each of the map elements is represented by relative coordinates indicating a relative position to the reference point set in the section to which each of the map elements belongs. The vehicle-side controller includes a processor and a memory storing a vehicle program. The vehicle program instructs the processor in the vehicle-side controller to detect position coordinates of the vehicle upon receiving a navigation signal transmitted by a positioning satellite, read traveling section data which is the section data of the section in which the vehicle exists based on the position coordinates, acquire surrounding area map data which is data indicating the position coordinates of the map elements existing around the vehicle based on the position information of the reference point set in a traveling section which is the section in which the vehicle exists and the relative coordinates of each of the map elements indicated by the traveling section data, acquire a detection result of a surrounding monitoring system mounted on the vehicle, detect the on-road installed object existing in a surrounding of the vehicle and identify a relative position of a detected object, which is the detected on-road installed object, to the vehicle, identify absolute coordinates of the detected object based on the relative position of the detected object and the position coordinates of the vehicle, identify absolute coordinates of the detected object indicated by the map data based on the surrounding area map data, employ a difference between the absolute coordinates of the detected object indicated by the map data and the absolute coordinates of the detected object identified based on the relative position of the detected object and the position coordinates of the vehicle as a deviation amount, transmit the deviation amount to the center in association with section information indicating the traveling section. The center-side controller includes a processor and a memory storing a center program. The center program instructs the processor in the center-side controller to receive the deviation amount transmitted from the vehicle unit, and calculate a correction amount for adjusting the coordinates of the reference point indicated in the traveling section data to an actual position based on the deviation amount. The vehicle program instructs the processor in the vehicle-side controller or the center program instructs the processor in the center-side controller to acquire the correction amount and correct the position information of the reference point by using the correction amount, and create corrected map data indicating the position coordinates of each of the map elements by using the corrected position information of the reference point and the relative coordinates of each of the map elements.

Embodiments of the present disclosure will be described below with reference to the drawings. FIG. 1 is a diagram showing an example of a schematic configuration of a map data providing system 100 according to the present disclosure. As shown in FIG. 1, the map data providing system 100 includes a vehicle unit 1 mounted on a vehicle and a center 2. Although only one vehicle on which the vehicle unit 1 is mounted is illustrated in FIG. 1 for the sake of convenience, two or more vehicles may be present. In this example, it is assumed that there are multiple vehicle units 1.

(Outline of Map Data Providing System 100)

Since position coordinates (in other words, a position on the Earth) of a map element change over time due to a crustal movement, an error between position coordinates shown in basic map data and actual position coordinates increases according to an elapsed time from creation of the basic map data. The map data providing system 100 according to the present embodiment is a system that creates corrected map data in which an error between the position coordinates shown in the basic map data and the actual position coordinates is reduced, and provides the corrected map data to a predetermined map data requester. In this example, the basic map data is map data indicating position information of various map elements identified by surveying operation.

In general, the vehicle unit 1 detects the degree of deviation between the position coordinates of each point shown in the basic map data and the actual position coordinates (hereinafter, referred to as the deviation amount) and reports the detected deviation amount to the center 2. The center 2 creates correction data for correcting the deviation between the position coordinates of each point shown in the basic map data and the actual position coordinates based on the deviation amount provided from the vehicle unit 1, and distributes the created correction data to the vehicle unit 1.

The vehicle unit 1 applies the correction data distributed from the center 2 to the basic map data provided by the vehicle unit 1 per se to dynamically create the corrected map data, and provides the corrected map data to a predetermined application software. For example, the vehicle unit 1 provides the corrected map data to application software providing a self-driving function (hereinafter referred to as a self-driving application) and application software providing a route guidance function (hereinafter referred to as a navigation application). In the present embodiment, the self-driving application is installed in an ECU (Electronic Control Unit) provided separately from the vehicle unit 1, but the present disclosure is not limited to the above configuration. The vehicle unit 1 per se may be provided with a self-driving application.

The vehicle on which the vehicle unit 1 is mounted is a vehicle traveling on a road. In the present embodiment, the vehicle on which the vehicle unit 1 is mounted is a four-wheeled vehicle, but the present disclosure is not limited to the above configuration. The vehicle unit 1 may be mounted on a two-wheeled vehicle, a three-wheeled vehicle, or the like. The two-wheeled vehicle may include a motorized bicycle.

The vehicle unit 1 is configured to be wirelessly connectable to a wide area communication network 3. In this example, the wide area communication network 3 refers to a public communication network provided by a telecommunication carrier, such as a cellular phone network or the Internet. The base station 31 shown in FIG. 1 is a radio base station for connecting the vehicle unit 1 to the wide area communication network 3.

The vehicle unit 1 has a function of receiving radio waves transmitted from GNSS satellites 4 to detect a current position of the vehicle unit 1. The GNSS satellites 4 are satellites used in a global navigation satellite system (GNSS). The GNSS satellites 4 transmit the radio waves including data indicating the current positions of the satellites per se (so-called ephemeris data). The radio waves transmitted by the GNSS satellites 4 are used by the vehicle unit 1 to identify the current position. Although only three GNSS satellites 4 are shown in FIG. 1 for the sake of convenience, there are four or more satellites. The GNSS satellites 4 corresponds to a positioning satellite.

Further, the vehicle unit 1 detects the deviation amount between the position coordinates shown in the basic map data and the actual position coordinates by a method to be described later, and sequentially transmits data indicating the detected deviation amount (hereinafter, deviation amount data) to the center 2 through the base station 31 and the wide area communication network 3.

Upon receiving the deviation amount data transmitted from the vehicle unit 1, the center 2 stores the deviation amount shown in the received deviation amount data in a predetermined database in association with vehicle IDs or the like. Then, with the multiple deviation amounts provided from the multiple vehicle units 1 as a population, the center 2 analyzes the deviation amount between the position coordinates of each point indicated by the basic map data and the actual position coordinates. The center 2 creates correction data based on the analysis result and delivers the created correction data to the vehicle unit 1.

A terminal ID, which is a unique identification number, is assigned to each of the communication terminals (for example, the vehicle unit 1 and the center 2) which perform the wide area communication.

(Configuration of Basic Map Data)

Now, a configuration of the basic map data will be described. The basic map data is road data indicating a connection relationship (so-called road network) of roads in a map recording area (for example, throughout Japan), and data indicating facility information.

The road data includes data indicating installation positions of traffic signs, road markings, traffic lights, railroad crossings, and the like, in addition to data indicating the connection relationship of roads, the road shapes, and the like. In other words, the road data also includes an object (hereinafter, an on-road installed object) installed on a road such as a traffic sign as a recording object (hereinafter, a map element). The basic map data is data indicating position information in which the various map elements are provided. In this example, the road includes a side area of the road on which the vehicle travels (that is, a region along the road) such as a sidewalk. The on-road installed object includes an object applied to a road surface, such as a lane marking.

The traffic sign is a sign board that displays regulations or instructions regarding road traffic. The traffic signs include guidance signs, alert signs, regulatory signs, indicator signs, auxiliary signs, and the like. A road marking is a sign that indicates regulations or instructions concerning the road traffic, and means a line, a symbol or a letter drawn on the road surface by a road rivet, paint, stone, and so on. For example, a lane marking indicating a boundary of a lane or the like, a pause line, or the like corresponds to the road marking.

Figure 2:
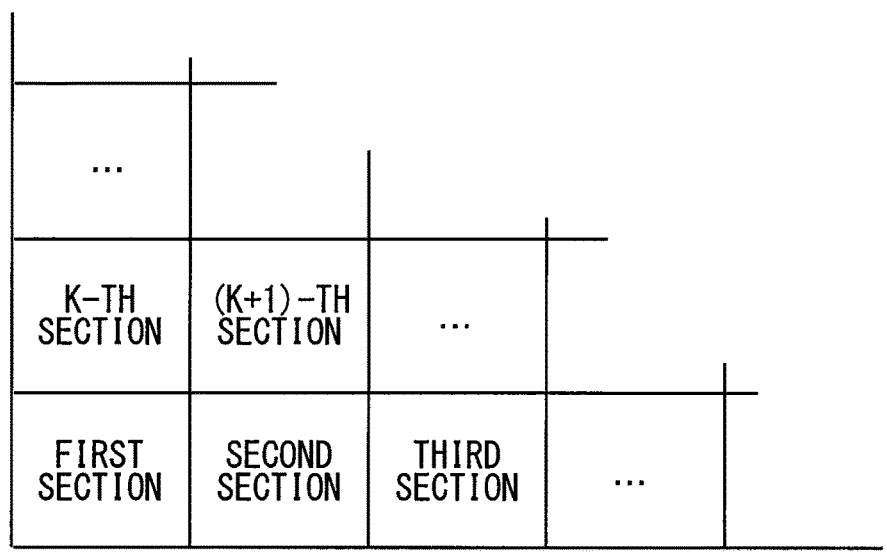
FIG. 2 is a diagram illustrating a configuration of basic map data.
Figure 3:
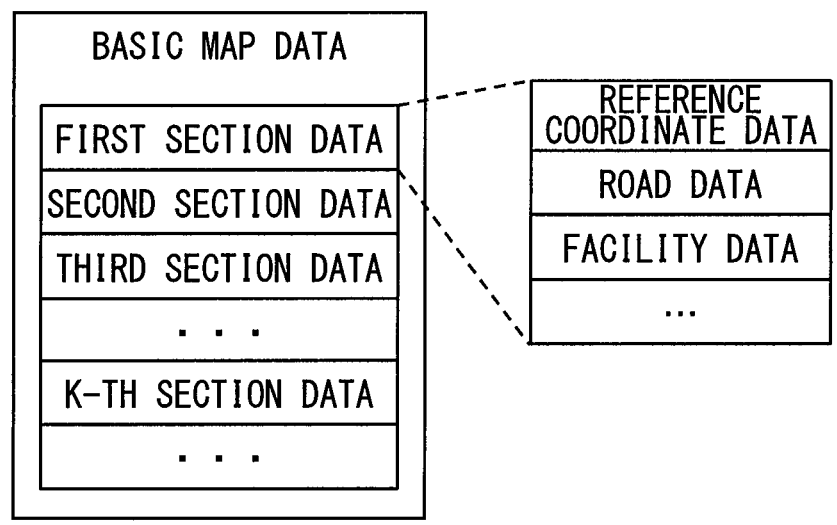
FIG. 3 is a diagram showing an example of the configuration of the basic map data.

As shown in FIGS. 2 and 3, the basic map data includes map data for each section obtained by dividing the map recording area into multiple sections. Hereinafter, the map data for each section included in the basic map data will also be described as section data. A group of the section data is configured as a data group in which the corresponding section data is arrayed in the order according to a geographical arrangement of the sections. For convenience, a section data having a k-th array order is represented as k-th section data. For example, first section data refers to section data whose array order is first. Symbol k is a natural number. The number of sections may be designed as appropriate, and in this case, it is assumed that the number of sections is 58000 as an example.

Each piece of section data is configured as map data indicating the position and the like of the map element in the corresponding section. In each section, a reference point is set. The section data includes reference coordinate data indicating the position coordinates of the reference point set in the section. In this example, the position coordinates are coordinates (that is, absolute coordinates) in a predetermined three-dimensional coordinate system (for example, WGS-84 coordinate system). The coordinates of the reference point may be represented by a coordinate system other than the WGS-84 coordinate system, such as an ITRF coordinate system. WGS is an abbreviation for World Geodetic System, and ITRF is an abbreviation for International Terrestrial Reference Frame. For convenience, the three axial directions configuring the three-dimensional coordinate system are referred to as an X-axis direction, a Y-axis direction, and a Z-axis direction.

The section data includes, in addition to the reference coordinate data, data on a road network provided in the section (that is, road data), facility data, and the like. The road data may be configured by, for example, node data for each node and link data for each link. The node is a binding point or a termination point between roads, such as an intersection. The link refers to a road connecting between the nodes. The node data describes information on a unique number (hereinafter referred to as a node ID) set for each node, a type of the node, a link connected to the node, and the like.

Figure 4:
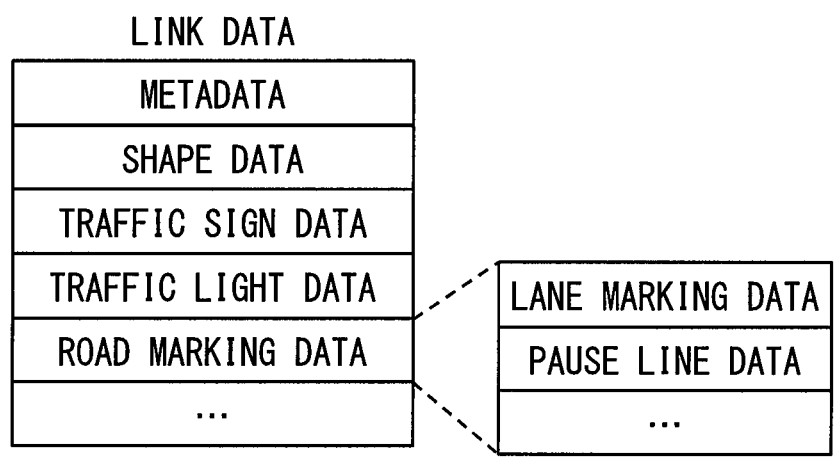
FIG. 4 is a diagram showing an example of a configuration of link data.

The link data includes, for example, metadata, shape data, traffic sign data, traffic light data, and road marking data, as shown in FIG. 4. The metadata is data indicating a unique number (hereinafter referred to as a link ID) set for each link, a link length indicating a length of the link, an ID of a node corresponding to a start end of the link, an ID of a node corresponding to an end of the link, a road type, and the like. The shape data is data indicating the shape of the link, and is data of a coordinate group representing the positions of multiple points set on the link. The traffic sign data is data indicating the installation position of the traffic sign. The traffic light data is data indicating the presence or absence of a traffic light and the installation position. The road marking data is data indicating the installation position of the road marking.

Figure 5:
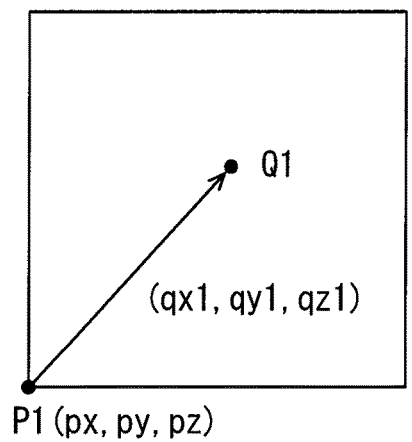
FIG. 5 is a diagram illustrating position information of a map element.

As shown in FIG. 5, multiple points set on the link to indicate the link shape, and the positions of various map elements such as traffic lights, traffic signs, and road markings are represented by relative coordinates indicating relative positions with respect to a reference point. Symbol P1 shown in FIG. 5 represents a reference point set in a first section, and Q1 represents a certain map element existing in the first section. The position information on the reference point P1 of the first section is represented by absolute coordinates, while the position of the map element Q1 is represented by relative coordinates relative to the reference point P1. If the coordinates of the reference point P1 are (px, py, pz) and the position information of the map element Q1 is (qx1, qy1, qz1), the absolute coordinates of the map element Q1 are coordinates in which the coordinates of the reference point P1 and the position information of the map element Q1 are combined together, that is, (px+qx1, py+qy1, pz+qz1).

In the present embodiment, the reference coordinate data is accommodated in the section data, but the present disclosure is not limited to the above configuration. The reference coordinate data may be stored in a table different from the section data. In that case, each piece of section data includes reference destination information for referring to the reference coordinate data corresponding to the section.

The positional information of various map elements included in the basic map data, such as the reference coordinate data and the data representing the relative coordinates of each map element is surveyed and identified by an administrative organ or a map creator (hereinafter referred to as a map administrator). The basic map data includes, in addition to the map data for each section, data indicating a time at which the basic map data has been created (in other words, a time at which surveying has been performed). For example, the basic map data includes data such as epoch.

Although FIG. 5 illustrates an example in which the reference point is placed at a position corresponding to the lower left of the section in the drawing, the present disclosure is not limited to the above case. The reference point may be set at the center of the section. In addition, a point at which a representative structure is present in the section may be set as a reference point. The position to be used as the reference point may be appropriately designed. In FIG. 5, a mode in which the section is set to a rectangular shape is illustrated, but a contour shape of the section is not limited to the rectangular shape. A polygonal shape other than a rectangular shape, such as a triangular shape or a hexagonal shape, may also be used.

The section data may have a hierarchical structure. For example, one section may be further subdivided into 16 sections, and one section may include 16 sub-section data. In that case, the number of sub-sections set in the map recording area is 58000×16=928000. When introducing a concept of the sub-sections, the relative coordinates (that is, position information) of each map element may be recorded in the map data of the sub-section.

(Configuration of Vehicle Unit 1)

Figure 6:
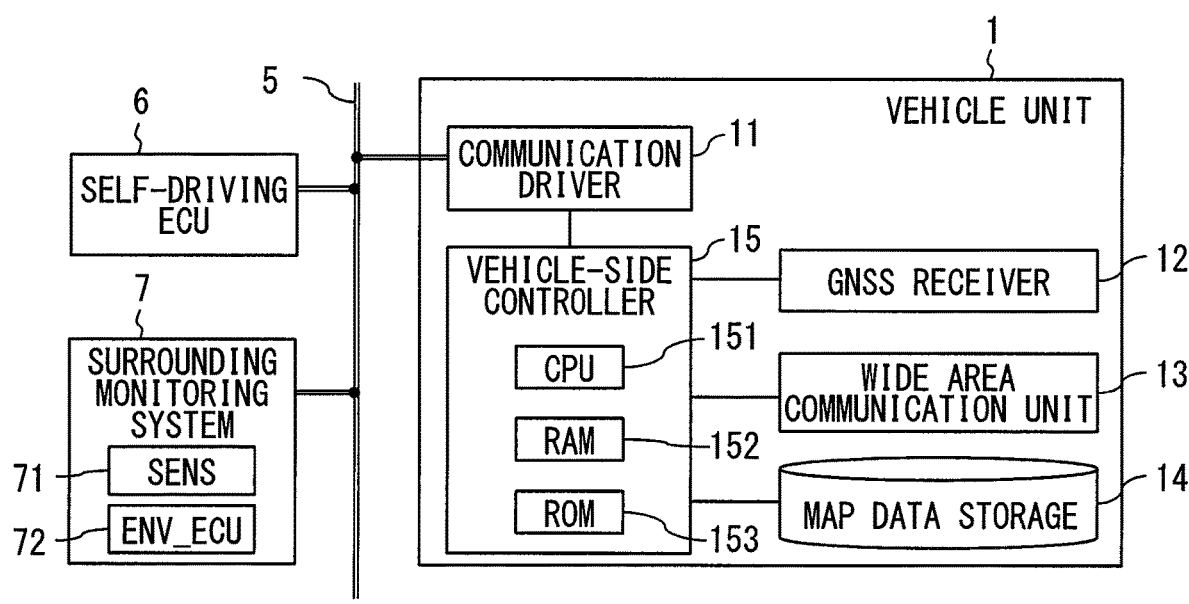
FIG. 6 is a diagram showing an example of a schematic configuration of a vehicle unit.

Now, a specific configuration of the vehicle unit 1 will be described. As shown in FIG. 6, the vehicle unit 1 is configured to be able to communicate with a self-driving ECU 6, a surrounding monitoring system 7, and the like through a communication network (that is, LAN: Local Area Network) 5 built in the vehicle. Hereinafter, a vehicle on which the vehicle unit 1 is mounted is also referred to as a subject vehicle.

The self-driving ECU 6 is an ECU including a computer in which a self-driving application is installed. The self-driving ECU 6 uses map data (specifically, corrected map data) provided from the vehicle unit 1 to automatically perform steering, acceleration, deceleration, and the like so that the subject vehicle travels along a travel plan (in other words, a scheduled travel route) set by a user. The self-driving ECU 6 and the vehicle unit 1 may be integrated together as described above. In other words, the vehicle unit 1 may be configured to provide a self-driving function.

The surrounding monitoring system 7 is a system that detects the presence of a predetermined detection target in the surrounding of the subject vehicle and identifies the relative position of an object that is detected (hereinafter referred to as a detected object) to the subject vehicle. The detection target is, for example, a traffic sign, a road marking, a traffic light, a guard rail, a utility pole, a curb, a ring, or the like. It is only necessary that part or all of the on-road installed objects registered as the map element in the basic map data, such as the traffic sign or road marking, are registered as the detection target. The specific content of the detection target may be designed as appropriate. The surrounding monitoring system 7 is realized by using a surrounding monitoring sensor (SENS) 71 and an environment recognition ECU (ENV_ECU) 72.

The surrounding monitoring sensor 71 is a sensor for detecting the detection target. As the surrounding monitoring sensor 71, for example, a surrounding monitoring camera for capturing an image of a predetermined range outside the vehicle, a millimeter wave radar for transmitting an inspection wave to a predetermined range outside the vehicle, LIDAR (Light Detection and Ranging/Laser Imaging Detection and Ranging), or the like can be employed. In this case, as an example, the surrounding monitoring sensor 71 is the surrounding monitoring camera. The surrounding monitoring camera serving as the surrounding monitoring sensor 71 sequentially outputs sequentially captured images to the environment recognition ECU 72.

The environment recognition ECU 72 performs a well-known image recognition process on the image data provided from the surrounding monitoring camera as the surrounding monitoring sensor 71, and detects the detection target such as the traffic sign. Further, the environment recognition ECU 72 identifies the relative position of the detected object to the subject vehicle. The detection results of the surrounding monitoring system 7 are provided to the vehicle unit 1 through a LAN 5, sequentially, for example, every 100 milliseconds.

The vehicle unit 1 includes a communication driver 11, a GNSS receiver 12, a wide area communication unit 13, a map data storage 14, and a vehicle-side controller 15. The communication driver 11 is configured to allow the vehicle-side controller 15 to communicate with other components connected to the LAN 5, such as the self-driving ECU 6 and the surrounding monitoring system 7. The communication driver 11 is configured to be able to communicate with the vehicle-side controller 15.

The GNSS receiver 12 receives radio waves transmitted from the GNSS satellites 4. When four or more GNSS satellites are captured, the GNSS receiver 12 sequentially calculates (in other words, detects) the current position of the GNSS receiver 12 based on the radio waves received from the respective GNSS satellites. The radio waves transmitted from the GNSS satellites 4 correspond to navigation signals.

The current position detected by the GNSS receiver 12 is represented by coordinates in a predetermined three-dimensional coordinate system. In this case, as an example, it is assumed that the current position is represented by a WGS-84 coordinate system. It is needless to say that the current position may be represented by a coordinate system other than the WGS-84 coordinate system, such as an ITRF coordinate system, for example. The reference coordinate data included in the basic map data and the reference point relative positions of the respective map elements are preferably expressed in the same geodetic system as the geodetic system adopted by the GNSS receiver 12. This is because a matrix calculation for coordinate transformation can be omitted in the same geodetic system. The information indicating the current position detected by the GNSS receiver 12 is sequentially provided to the vehicle-side controller 15. The GNSS receiver 12 corresponds to a vehicle position detector.

The wide area communication unit 13 is a communication module that connects to the wide area communication network 3 for communicating with the center 2. The wide area communication unit 13 modulates data input from the vehicle-side controller 15 and transmits the modulated data to the center 2. In addition, the wide area communication unit 13 receives the data transmitted from the center 2 and supplies the received data to the vehicle-side controller 15.

The map data storage 14 is a nonvolatile storage medium that stores the basic map data described above. The map data storage 14 may be realized by using, for example, a hard disk drive, a flash memory, or the like. The map data storage 14 is configured so that data can be read by the vehicle-side controller 15. In the present embodiment, the map data storage 14 stores data for all sections, but the present disclosure is not limited to the above configuration. The map data storage 14 may store the section data in a range used by the user. Thus, as another aspect, only the map data for a part of the sections may be stored.

The vehicle-side controller 15 is configured as a normal computer, and includes a CPU 151 as a central processing unit, a RAM (Random Access Memory) 152 as a volatile storage medium, a ROM (Read Only Memory) 153 as a rewritable nonvolatile storage medium, an I/O, bus lines for connecting those components, and the like. The ROM 153 stores a program (hereinafter, referred to as vehicle program) for causing a normal computer to function as the vehicle-side controller 15 in the present embodiment.

The above-mentioned vehicle programs may be stored in a non-transitory tangible storage medium. The execution of the vehicle program by the CPU 151 corresponds to the execution of a process corresponding to the vehicle program. Functions of the vehicle-side controller 15 will be described below.

(Function of Vehicle-side controller 15)

Figure 7:
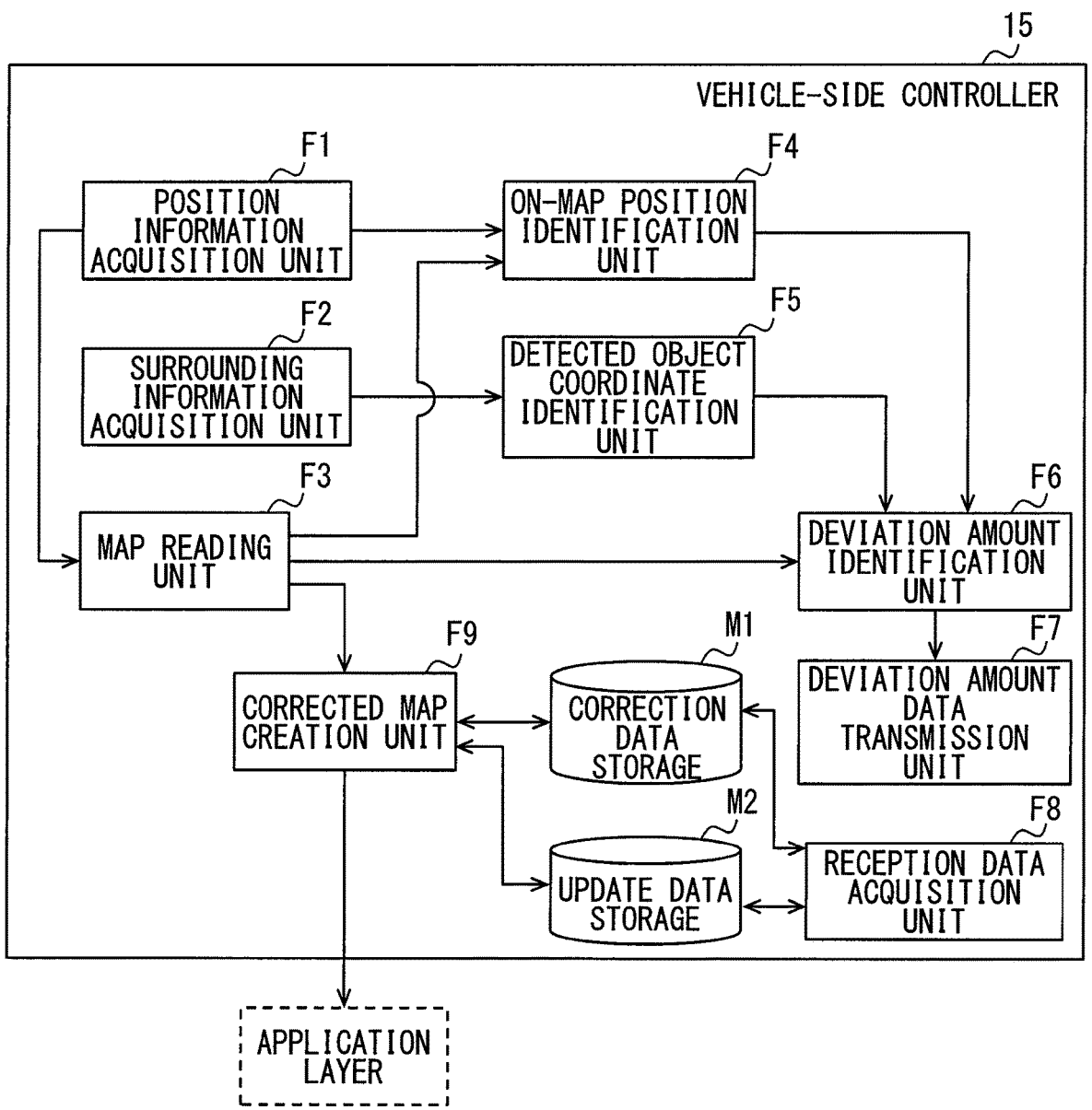
FIG. 7 is a diagram showing an example of a schematic configuration of a vehicle-side controller.

The vehicle-side controller 15 provides various functions shown in FIG. 7 by the CPU 151 executing vehicle programs stored in the ROM 153. In other words, the vehicle-side controller 15 includes, as functional blocks, a position information acquisition unit F1, a surrounding information acquisition unit F2, a map reading unit F3, an on-map position identification unit F4, a detected object coordinate identification unit F5, a deviation amount identification unit F6, a deviation amount data transmission unit F7, a reception data acquisition unit F8, and a corrected map creation unit F9.

The vehicle-side controller 15 includes a correction data storage M1 and an update data storage M2 as a configuration realized by using a nonvolatile and rewritable storage medium. The correction data storage M1 and the updated data storage M2 may be realized by using, for example, a part of a storage area included in the ROM 153.

The position information acquisition unit F1 sequentially acquires coordinates indicating the current position of the vehicle unit 1 (hereinafter referred to as detected subject vehicle position) from the GNSS receiver 12. The detected subject vehicle position acquired by the position information acquisition unit F1 is stored in the RAM 152 for a predetermined period of time with a time stamp indicating the acquisition time (in other words, the detection time).

The detected subject vehicle positions at a plurality of time points may be sorted in time series order and stored in the RAM 152 so that, for example, the latest data is head data. The detected subject vehicle position stored in the RAM 152 is referred to by the map reading unit F3, the on-map position identification unit F4, and the like. In the present embodiment, the coordinate information output by the GNSS receiver 12 is directly adopted as the coordinate information of the subject vehicle, but the present disclosure is not limited to the above configuration. The coordinates obtained by correcting the detection result of the GNSS receiver 12 according to the installation position of the GNSS receiver 12 in the subject vehicle may be used as coordinates indicating the current position of the subject vehicle. For example, the detection result of the GNSS receiver 12 may be corrected so that the detected subject vehicle position indicates the position of the center of the subject vehicle.

The surrounding information acquisition unit F2 acquires data indicating the relative position of the detection target existing in the surrounding of the subject vehicle from the surrounding monitoring system 7. In the present embodiment, the on-road installed object is recorded in the basic map data as a map element, and the on-road installed object is set as the detection target of the surrounding monitoring system 7. Thus, the data provided from the surrounding monitoring system 7 functions as data indicating the relative position of the on-road installed object (hereinafter, the detected object) existing in the surrounding of the subject vehicle and detected by the surrounding monitoring system 7.

The map reading unit F3 reads out the map data (hereinafter referred to as surrounding area map data) around the subject vehicle from the map data storage 14 based on the detected subject vehicle position acquired by the position information acquisition unit F1. For example, the map reading unit F3 reads the map data of the section including the detected subject vehicle position as the surrounding area map data. The section including the detected subject vehicle position corresponds to a section in which the subject vehicle is traveling (hereinafter referred to as a traveling section). The map reading unit F3 corresponds to a surrounding area map data acquisition unit, and the section data corresponding to the traveling section corresponds to the traveling section data.

As another mode, the map reading unit F3 may read not only the map data of the traveling section but also the map data of the section adjacent to the traveling section or the section existing in the traveling direction of the subject vehicle as the surrounding area map data. When the route information on which the subject vehicle is scheduled to travel can be acquired, the map data of the section through which the scheduled travel route passes may be read out. The scheduled travel route information may be acquired from other ECUs connected to the LAN 5. The scheduled travel route information can be acquired from, for example, a navigation ECU that performs a route guidance process or the like.

The on-map position identification unit F4 is configured to perform a well-known map matching process to identify the position of the subject vehicle on the basic map data (hereinafter referred to as an on-map vehicle position). Specifically, the on-map position identification unit F4 identifies a traveling locus of the subject vehicle position based on time-series data in which the detected subject vehicle positions are arrayed at a plurality of time points in time series order, and comparing the identified traveling locus with the road shape obtained from the surrounding area map data to identify the on-map subject vehicle position. Then, the on-map position identification unit F4 provides the deviation amount identification unit F6 with coordinate information indicating the on-map subject vehicle position. The on-map subject vehicle position is represented by absolute coordinates.

When the subject vehicle unit 1 can acquire information such as the traveling speed and the traveling direction of the subject vehicle, and the acceleration acting on the vehicle, a map matching process using the above information may be performed. Information on a traveling speed or the like may be acquired from a predetermined ECU or sensor through the LAN 5. The on-map position identification unit F4 corresponds to an on-map subject vehicle position identification unit.

As another mode, the on-map position identification unit F4 may identify the on-map subject vehicle position by position of the on-road installed object from the on-map detected object coordinates of the on-road installed object identified by back calculation of the relative position of the on-road installed object to the subject vehicle from the on-map detected object coordinates of the on-road installed object identified by the detected object coordinate identification unit F5, which will be described later.

The detected object coordinate identification unit F5 calculates (that is, identifies) the absolute coordinates of the detected object based on the relative position of the detected object to the subject vehicle, which has been acquired by the surrounding information acquisition unit F2, and the detected subject vehicle position. Then, the detected object coordinate identification unit F5 provides the calculated absolute coordinates of the detected object (hereinafter referred to as detected object coordinates) to the deviation amount identification unit F6 in association with element type information indicating the type of the detected object (that is, a speed limit sign or the like).

The deviation amount identification unit F6 is configured to identify the degree of deviation (that is, the deviation amount) between the position of the map element indicated in the basic map data and the actual position of the map element based on the detected subject vehicle position. As a first method, the deviation amount identification unit F6 calculates a difference between the detected subject vehicle position and the on-map subject vehicle position, and employs the calculated difference as the deviation amount.

The deviation amount may be represented by a parameter of a three-dimensional coordinate system adopted as a representation format of the position of the map element in the basic map data. For example, when the detected subject vehicle position is (vax, vay, vaz) and the subject vehicle position on the map is (vbx, vby, vbz), the deviation amount is (vax-vbx, vay-vby, vaz-vbz). In other words, the deviation amount is expressed as a difference in the X-axis direction, a difference in the Y-axis direction, and a difference in the Z-axis direction.

As a second method, the deviation amount identification unit F6 identifies the deviation amount with the use of the detected object coordinates and the element type information provided from the detected object coordinate identification unit F5. Specifically, the deviation amount identification unit F6 identifies the on-road installed object corresponding to (in other words, the same as) the detected object from the multiple on-road installed objects shown in the basic map data based on the detected object coordinates and the element type information, and identifies the position coordinates of the identified on-road installed object on the basic map data (hereinafter, the on-map detected object coordinates). The on-map detection object coordinates are coordinates obtained by combining the absolute coordinates of the reference point and the relative coordinates set for the on-road installed object. Then, the deviation amount identification unit F6 calculates a difference between the on-map detected object coordinates and the detected object coordinates identified by the detected object coordinate identification unit F5 as a deviation amount.

The deviation amount identification unit F6 according to the present embodiment is configured to be able to execute both the first method and the second method, but is not limited to the above configuration. Only one of the methods may be implemented.

The deviation amount identified by the deviation amount identification unit F6 is provided to the deviation amount data transmission unit F7. In addition, as a more preferable mode in the present embodiment, the deviation amount identified by the deviation amount identification unit F6 is stored in the correction data storage M1 in association with identified date and time information indicating identified date and time and identified location information indicating the position of the subject vehicle at the time of identifying the deviation amount.

The deviation amount identification process by the deviation amount identification unit F6 (hereinafter referred to as deviation amount identification process) may be performed when predetermined identification process execution conditions are satisfied. For example, the deviation amount identification process may be performed at a time point when a travel distance within a certain section becomes equal to or larger than a predetermined identification permissible distance. The identification permissible distance may be a distance that allows map matching based on a traveling locus in the traveling section. In the present embodiment, as an example, the identification process execution condition is designed such that the number of times the deviation amount identification process is executed for one section per day is one.

As another mode, the identification process execution condition may be designed so that the deviation amount identification process for the same section can be executed multiple times in one day. For example, the deviation amount identification process may be performed each time the vehicle travels by the identification permissible distance within the same section. Alternatively, the deviation amount identification process may be performed every predetermined time. The number of times and intervals of performing the deviation amount identification process for one section may be appropriately designed. The identification process execution condition may be set so that the deviation amount identification process for the same section is executed only when a predetermined time (for example, one week) or more has elapsed since the previous execution.

The deviation amount data transmission unit F7 cooperates with the wide area communication unit 13 to transmit the deviation amount data indicating the deviation amount identified by the deviation amount identification unit F6 to the center 2. Specifically, the deviation amount data transmission unit F7 outputs the deviation amount data to the wide area communication unit 13, and transmits a communication packet containing the deviation amount data addressed to the center 2. The deviation amount data includes, in addition to the deviation amount, a section number indicating a section in which the subject vehicle is traveling. The section number shown in the deviation amount data indicates for which section the deviation amount data is provided. The section number corresponds to section information.

The deviation amount data preferably includes a vehicle ID, identification date and time information, identification location information, and the like in addition to the deviation amount and the section number. According to the present embodiment, it is assumed that the deviation amount data includes the section number, the deviation amount, the vehicle ID, the identification date and time information, and the identification location information.

The deviation amount data transmission unit F7 according to the present embodiment transmits the deviation amount data each time the deviation amount is identified. As another aspect, when the identification process execution condition is designed such that the deviation amount identification process can be executed multiple times per day, the deviation amount data for one section may be transmitted multiple times per day. When the deviation amount for the same section is calculated multiple times in one day, the deviation amount data transmission unit F7 may be configured to transmit data obtained by averaging or obtaining a median value of the multiple deviation amounts calculated for the same section as the deviation amount data.

The reception data acquisition unit F8 acquires data delivered from the center 2 to the vehicle unit 1 and received by the wide area communication unit 13. For example, the reception data acquisition unit F8 acquires correction data and update data. The reception data acquisition unit F8 corresponds to a data acquisition unit.

The correction data is data indicating a correction amount of the position coordinates (that is, the reference coordinate data) of the reference point shown in the basic map data, which is created by the center 2 based on the deviation amount data transmitted from the vehicle unit 1 to the center 2. The correction data is prepared for each section (in other words, for each reference point). Thus, the correction data includes not only the correction amount but also the section number. The section number is responsible for indicating which section reference point the received correction data is for.

The update data is data indicating deletion or addition of the map elements such as links, nodes, facilities, or traffic signs. In other words, the update data represents the map data representing a changed portion from the time point when the basic map data is created. The position information on the map element added in the update map data is represented by relative coordinates with reference to the reference point.

The update data may also be distributed for each section. Further, it is assumed that data indicating the freshness of data such as date on which the update data is created and version information is added to the update data. The update data may represent a difference from the basic map data, or may represent a difference from the previous version.

When acquiring the correction data, the reception data acquisition unit F8 stores the data in the correction data storage M1. When acquiring the update data, the received data acquisition unit F8 stores the data in the update data storage M2. Each of the correction data storage M1 and the update data storage M2 can be referred to by the reception data acquisition unit F8 and the corrected map creation unit F9.

The corrected map creation unit F9 creates corrected map data in which the error between the position coordinates shown in the basic map data and the actual position coordinates is reduced with the use of the correction data stored in the correction data storage M1 and the basic map data.

More specifically, the corrected map creation unit F9 reads out the correction data of a section (hereinafter referred to as a target section) for which the corrected map data is to be created from the correction data storage M1, and corrects the position coordinates of the reference point of the target section. Then, the corrected map creation unit F9 combines (in other words, adds) the corrected position coordinates of the reference point and the relative coordinates of each map element included in the target section together, to thereby create the corrected map data indicating the absolute coordinates of each map element.

The corrected map data created in this manner corresponds to map data in which the position of the map element indicated by the basic map data is slid (in other words, moved) by the correction amount. The corrected map data may be created for each section. The created corrected map data is provided to a requester of the map data, such as the self-driving ECU 6. In other words, the corrected map creation unit F9 creates and provides the corrected map data of the requested section based on a request from application software.

When the corrected map data is created, a change in the map element indicated by the update data is also reflected. The corrected map creation unit F9 combines the update data with the map data of the target section included in the basic map data, to thereby reflect the addition or deletion of the map element. Thereafter, the processing of the procedure described above may be performed. The corrected map creation unit F9 corresponds to a vehicle-side corrected map creation unit.

(Configuration of Center 2)

Figure 8:
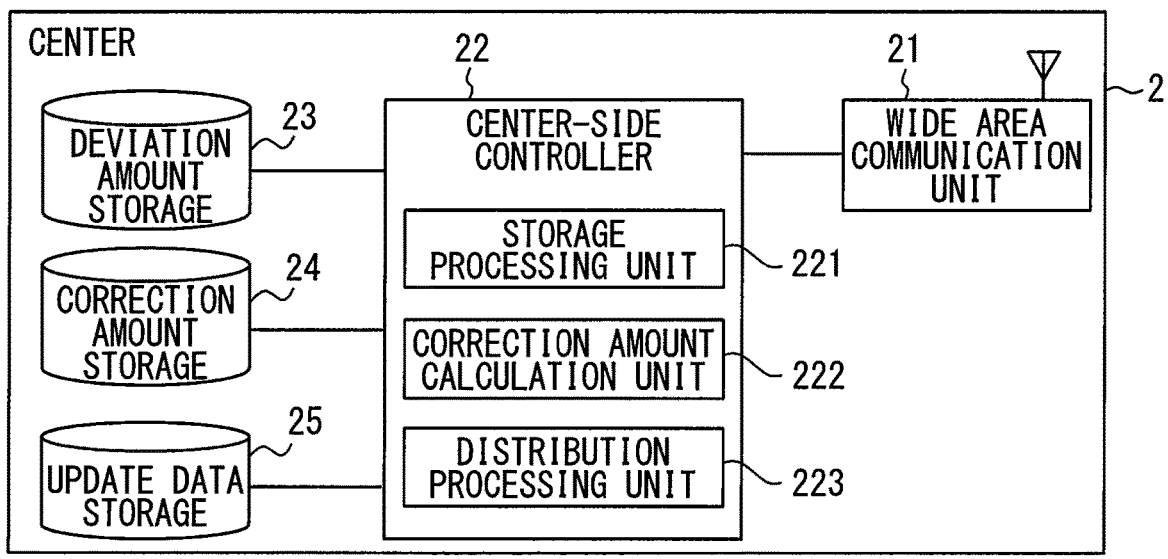
FIG. 8 is a diagram showing an example of a schematic configuration of a center.

Next, a configuration of the center 2 will be described. As shown in FIG. 8, the center 2 includes a wide area communication unit 21, a center-side controller 22, a deviation amount storage 23, a correction amount storage 24, and an update data storage 25. The center-side controller 22 is connected to the wide area communication unit 21, the deviation amount storage 23, the correction amount storage 24, and the update data storage 25 so as to be able to communicate with each other.

The wide area communication unit 21 is a communication module for performing a wide area communication with the vehicle unit 1. The wide area communication unit 21 outputs the received data to the center-side controller 22, modulates the data input from the center-side controller 22, and outputs the modulated data to the wide area communication network 3. The communication packet output to the wide area communication network 3 is transmitted to the vehicle unit 1.

The center-side controller 22 has a function of controlling the entire operation of the center 2. The center-side controller 22 is configured as a computer. That is, the center-side controller 22 includes a CPU, a RAM, a ROM, an I/O, a bus line for connecting those components, and the like. The center-side controller 22 includes, as functional blocks, a storage processing unit 221, a correction amount calculation unit 222, and a distribution processing unit 223. The storage processing unit 221, the correction amount calculation unit 222, and the distribution processing unit 223 may be realized by causing a CPU (not shown) to execute a predetermined program (center program). As another mode, those units may be realized with the use of a hardware member such as an IC.

The storage processing unit 221 stores the deviation amount data transmitted (in other words, uploaded) from the vehicle unit 1 in the deviation amount storage 23. Specifically, the storage processing unit 221 stores the section number, the deviation amount, the vehicle ID, the identification date and time information, and the identification location information shown in the deviation amount data in the deviation amount storage 23 in association with each other.

The deviation amount storage 23 is realized with the use of a rewritable nonvolatile storage medium. In the deviation amount storage 23, the multiple deviation amount data may be stored separately for each section number (in other words, for each section). The deviation amount data may be sorted and stored in time series order such that, for example, the latest identification date and time information is at the top.

The correction amount calculation unit 222 calculates the correction amount of the reference point for each section based on the deviation amount data for each section, and stores the calculated correction amount in the correction amount storage 24. The correction amount for a certain reference point corresponds to the amount of movement for matching the position coordinates of the reference point shown in the basic map data as the reference coordinate data with the actual position coordinates. The data in which the section number is assigned to the data indicating the correction amount of the reference point corresponds to the correction data.

As an example, when calculating the correction amount for a certain section, the correction amount calculation unit 222 according to the present embodiment determines the correction amount with the use of the multiple deviation amount for the section (hereinafter, target section) to be targeted. More specifically, as shown in FIG. 9, the correction amount calculation unit 222 sets the multiple amounts of deviation for the target section stored in the deviation amount storage 23 as coordinates of a center of gravity of a point group plotted by assuming the coordinates of a three-dimensional coordinate system having the reference point as an origin.

Figure 9:
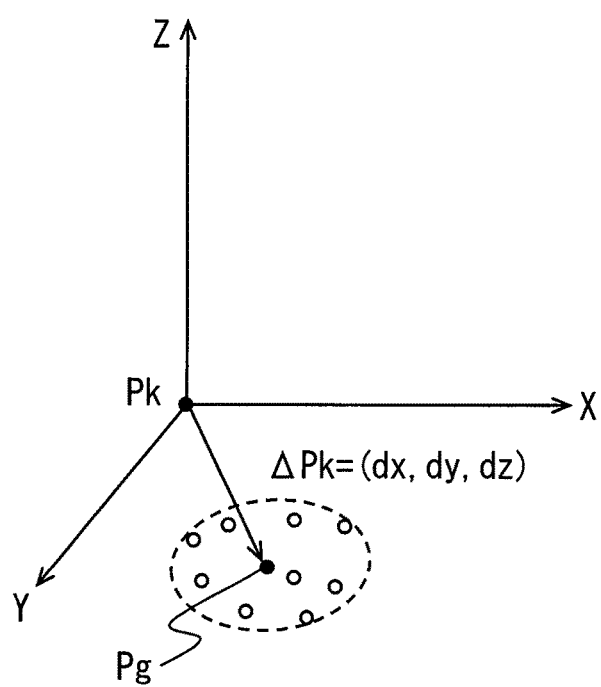
FIG. 9 is a diagram illustrating a calculation method of a correction amount.

FIG. 9 is a diagram conceptually showing the operation of the correction amount calculation unit 222 when calculating the correction amount of a k-th section. Hollowed dots shown in FIG. 9 are dots corresponding to the deviation amount associated with the k-th section. As shown in FIG. 9, the origin of the three-dimensional coordinate system used when determining the correction amount of the k-th section corresponds to a reference point Pk of the k-th section. Symbol Pg represents the center of gravity of a dot group corresponding to the multiple deviation amounts. A vector ΔPk (dx, dy, dz) from the origin toward the center of gravity Pg corresponds to the correction amount. The correction amount is expressed as a set of data including a correction value in the X-axis direction, a correction value in the Y-axis direction, and a correction value in the Z-axis direction.

As another mode, the value of the correction amount for each axial direction may be a mean value or a median value of the values of the multiple deviation amounts for each axial direction. Further, the correction amount calculation unit 222 may be configured to adopt one deviation amount identified at any one time point as the correction amount as it is.

It is preferable that the deviation amount used as the population for calculating the correction amount for a certain section is the deviation amount in which the date and time indicated by the identification date and time information is within a most recent predetermined period (for example, three months or six months). This is because, if past data are included in the population for six months or more, a deviation corresponding to crustal movements during the period is included as noise. In other words, according to the above configuration, the correction can be created data with a higher accuracy.

The correction data for each section may be created in a predetermined update cycle (for example, every three months). In other words, the correction data for each section is updated at a predetermined update cycle. The correction data of all the sections may be simultaneously updated in a predetermined update cycle, or may be executed at a timing shifted for each section. Further, the correction data may be created based on an input operation from the map administrator (that is, by a manual operation).

The correction amount storage 24 is realized with the use of a rewritable nonvolatile storage medium. In the correction amount storage 24, the correction data for each section is stored in association with the update date information indicating the date on which the data has been created. The update data storage 25 is also realized with the use of a rewritable nonvolatile storage medium. The update data is stored in the update data storage 25. The update data per se may be created by an administrative organization or a map creator.

The distribution processing unit 223 cooperates with the wide area communication unit 21 to distribute the correction data. The distribution of the correction data may be performed on the basis of a request from the vehicle unit 1. As another mode, the correction data may be distributed every time the correction data is updated. The correction data may be distributed in units of sections, or the correction data of all sections may be distributed collectively (in a packaged manner).

The correction data may be delivered in a compressed state. However, because the total size of the correction data for all the sections is approximately 9 MB according to the estimation, the necessity of compression is not high. Therefore, according to the present embodiment, the correction data is distributed without compression. The method of distributing the correction data is not limited to distribution by communication. A tangible storage medium such as a DVD may be used for distribution in a car goods shop, a dealer, or the like. The distribution processing unit 223 also distributes the update data to the vehicle unit 1 at a predetermined timing.

(Advantages of Embodiments)

Figure 10:
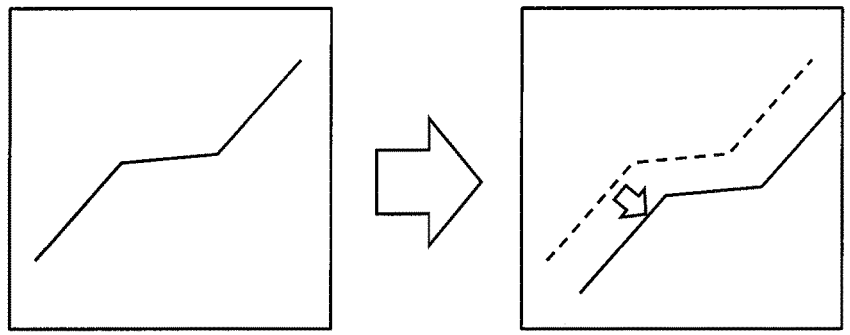
FIG. 10 is a diagram illustrating effects of the embodiment.

As shown in FIG. 10, the position coordinates (in other words, the position on the Earth) of the map elements change over time due to crustal movements. Thus, in order to maintain a state in which the error between the position coordinates of each point shown in the basic map data and the actual position coordinates falls within a range usable in an application such as self-driving, there is a need to update the position information relatively frequently.

In the configuration described above, the position information on various map elements is represented by relative coordinates indicating the relative position with respect to the reference point set in the section to which the map element belongs. Thus, even when the position of a certain section moves in parallel due to the crustal movement, the position coordinates of the reference point are corrected to match the actual position coordinates, thereby being capable of adjusting the position of the map element indicated by the section data to the actual position. In other words, a labor of updating the data of the position coordinates for each map element can be reduced.

The correction amount for matching the position coordinates of the reference point included in the basic map data with the actual position coordinates is determined by a calculation processing using the deviation amount detected by the vehicle unit 1. Thus, in order to identify the correction amount, it is not necessary for the administrator of the map data (for example, the map creator) to go to a site and perform surveying operation. Therefore, according to the above configuration, the map data in which the error between the actual position coordinates and the position coordinates shown in the map data is reduced can be provided at low cost.

Further, in the above configuration, the center 2 calculates the correction amount with respect to one reference point using the multiple deviation amounts provided from the multiple vehicle units 1. According to the configuration described above, a more accurate correction amount in which the error of each vehicle unit 1 is reduced can be used. As a result, the corrected map data created by the vehicle unit 1 becomes map data in which the error between the actual position coordinates and the position coordinates shown in the map data is further reduced.

In the above configuration, the information to be transmitted as the correction data is mainly data indicating the correction amount of the reference point, and there is no need to transmit the data for each map element. Therefore, a traffic volume and a communication fee between the center 2 and the vehicle unit 1 can be reduced.

Furthermore, according to the configuration described above, the vehicle unit 1 may also acquire correction data for the section in which the subject vehicle per se has not yet traveled, in order to obtain correction data for any section from the center 2. The correction data for the section in which the subject vehicle per se has not yet traveled is the correction data calculated based on the deviation amount provided by the other vehicle unit 1. In other words, the multiple vehicle units 1 can share correction data of various sections through the center 2.

In addition, according to the above-described configuration, since the administrator of the map data can provide the map data in which the error between the actual position coordinates and the position coordinates shown in the map data is reduced at low cost, eventually, the cost for the user to use the corrected map data can be reduced.

In addition, the correction amount for matching the position coordinates of the reference point included in the map data with the actual position coordinates is determined by a calculation processing using the deviation amount identified by the deviation amount identification unit included in the vehicle unit. Thus, it is unnecessary for the administrator of the map data (for example, the map creator) to go to the site and perform the surveying operation in order to identify the correction amount.

The members having the same functions as those described in the above embodiment are denoted by the identical reference numerals, and a redundant description will be omitted. When only a part of the configuration is referred to, the configuration of the embodiment described above can be applied to other parts.

(Modification 1)

It is preferable that the vehicle unit 1 transmits, as the deviation amount data, deviation amount data including information indicating a detection accuracy of the subject vehicle position information used when identifying the deviation amount (hereinafter referred to as accuracy index information). The accuracy index information is, for example, the number of GNSS satellites 4 captured by the vehicle unit 1 or an S/N ratio of received radio waves for each GNSS satellite 4. In this example, the S/N ratio of the GNSS of the satellites 4 used in the positioning calculation is used as the accuracy index information. The accuracy index information may be created by the deviation amount identification unit F6.

According to the configuration described above, the correction amount calculation unit 222 can evaluate the reliability of the deviation amount by referring to the accuracy index information associated with the deviation amount. Since the deviation amount is calculated with the use of the subject vehicle position information detected by the GNSS receiver 12, the deviation amount identified in a situation where the reception state of the radio waves from the GNSS satellite 4 is excellent is, naturally higher in reliability than the deviation amount identified in the situation where the reception state of the radio waves from the GNSS satellite 4 is poor.

The correction amount calculation unit 222 in Modification 1 evaluates the reliability of each deviation amount stored in the deviation amount storage 23, and calculates the correction amount by preferentially using the deviation amount having a relatively high reliability among the multiple deviation amounts provided from the multiple vehicle units 1. For example, when the correction amount calculation unit 222 is configured to calculate the correction amount with the use of N deviation amounts, where N is a natural number, the deviation amount having high reliability is preferentially adopted as the population for calculating the correction amount. According to the configuration described above, the correction amount can be calculated with a higher accuracy.

The mode of calculating the correction amount by using the deviation amount having a high reliability preferentially includes a mode of calculating the correction amount with the use of only the deviation amount having a high reliability. Whether or not the reliability is high may be determined with the use of a criterion corresponding to the type of the accuracy index information, such as whether or not the SN ratio is equal to or greater than a predetermined threshold.

(Modification 2)

Figure 11:
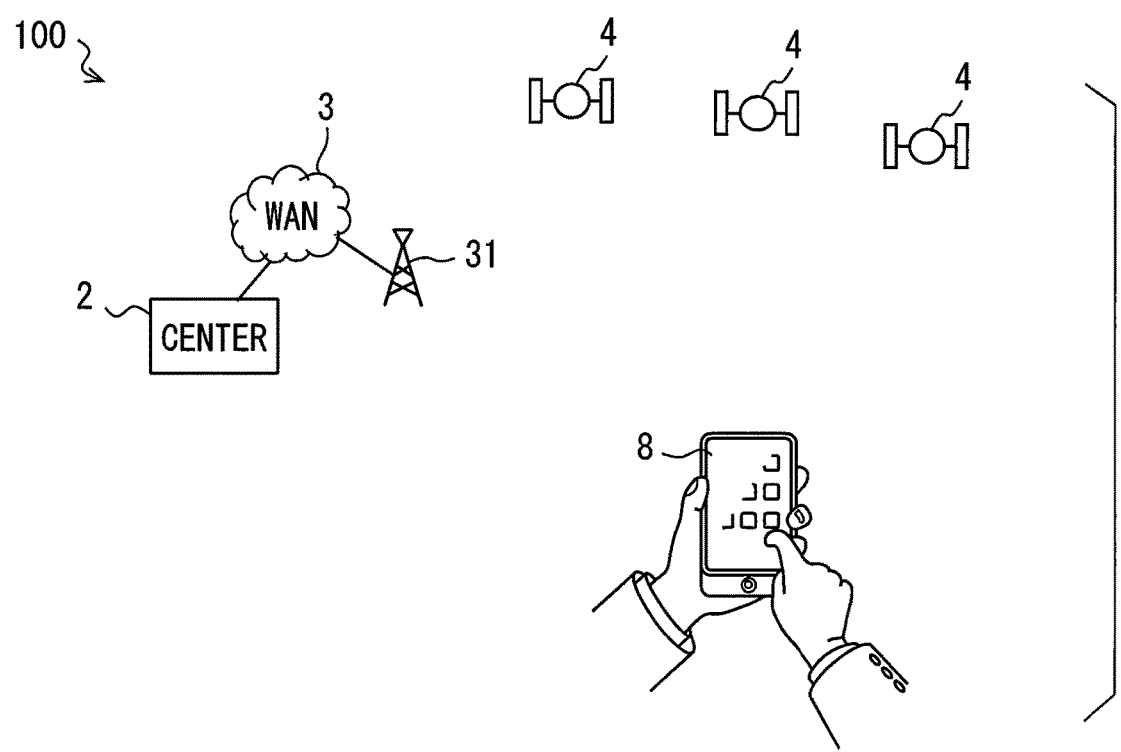
FIG. 11 is a diagram showing a configuration of a map data providing system in Modification 2.

As shown in FIG. 11, a map data providing system 100 may include a communication terminal 8 different from the vehicle unit 1, and a center 2 may be configured to distribute corrected map data to a communication terminal 8. According to the configuration described above, the communication terminal 8 other than the vehicle unit 1 can also use the corrected map data.

The communication terminal 8 in this example is a device having a wide area communication function and a GNSS receiver. For example, a smartphone, a tablet terminal, a portable navigation device, or the like can be employed as the communication terminal 8. The communication terminal 8 corresponds to a map use terminal.

Figure 12:
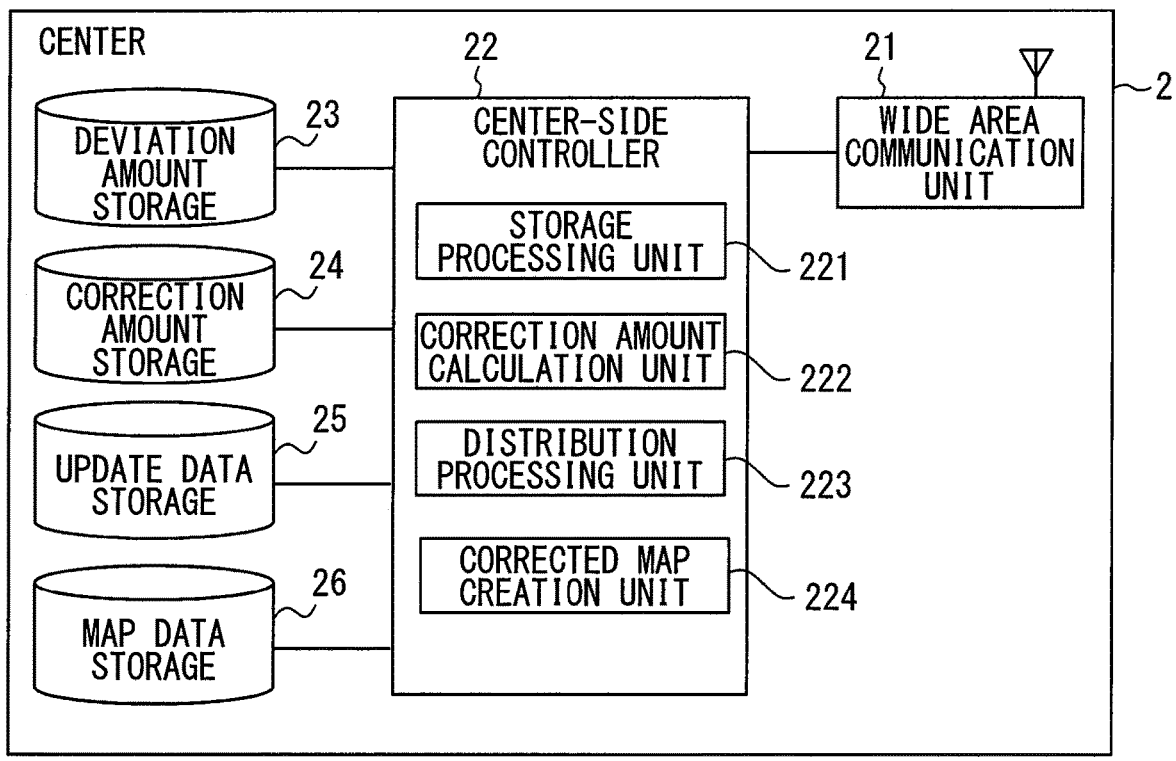
FIG. 12 is a diagram showing a configuration of a center in Modification 2.

As shown in FIG. 12, for example, the center 2 according to Modification 2 includes a map data storage 26 and a corrected map creation unit 224. The map data storage 26 is a database in which basic map data is stored. The corrected map creation unit 224 has a configuration corresponding to the corrected map creation unit F9 described above. The corrected map creation unit 224 corresponds to a center-side corrected map creation unit.

Based on a request from the communication terminal 8, the center 2 creates and transmits the corrected map data of the section requested by the communication terminal 8. For example, the center 2 creates and transmits the corrected map data of a section in which the communication terminal 8 is present. According to the configuration of Modification 2, even a vehicle without the vehicle unit 1 can use the corrected map data if the communication terminal 8 is provided. The vehicle unit 1 can also obtain and use the corrected map data from the center 2.

According to the configuration of Modification 2, the vehicle unit 1 does not need to include the corrected map creation unit F9. Thus, the calculation processing load in the vehicle-side controller 15 can be reduced.

(Modification 3)

Figure 13:
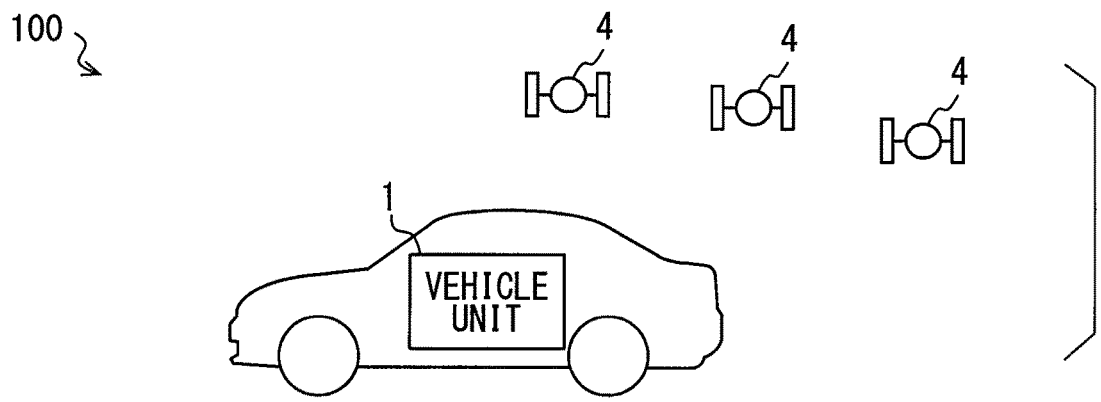
FIG. 13 is a diagram showing a configuration of a map data providing system in Modification 3.

In the above description, the configuration in which the map data providing system 100 includes the center 2 has been disclosed, but the present disclosure is not limited to the above configuration. As shown in FIG. 13, the map data providing system 100 does not have to include the center 2. Such a map data providing system 100 will be described below as Modification 3.

Figure 14:
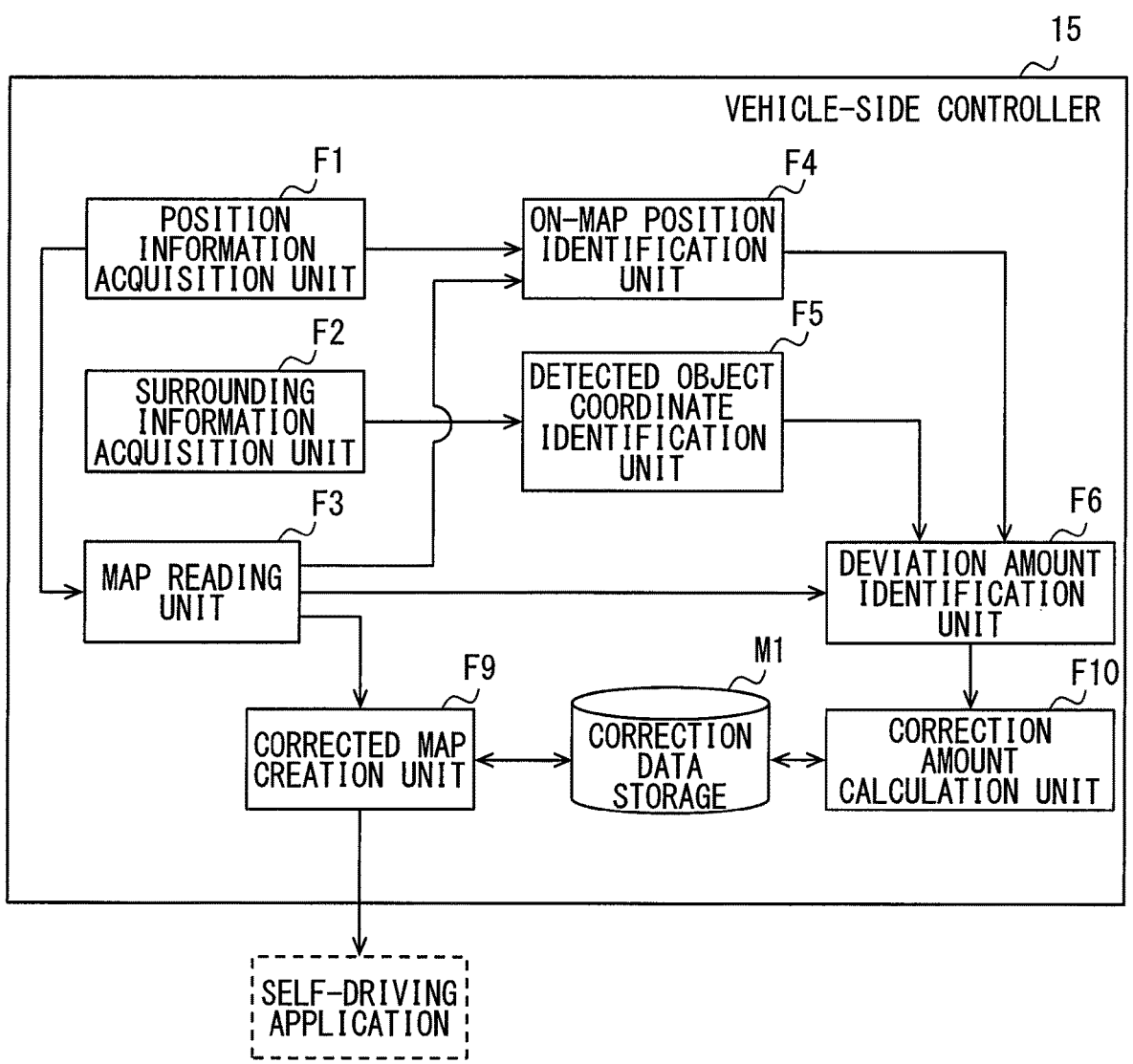
FIG. 14 is a diagram showing a configuration of a vehicle-side controller in Modification 3.

As shown in FIG. 14, a vehicle-side controller 15 in Modification 3 includes a correction amount calculation unit F10. The correction amount calculation unit F10 has a configuration corresponding to the correction amount calculation unit 222 described above. Similarly to the center 2, the correction amount calculation unit F10 calculates the correction amount with the use of the multiple amounts of deviation identified by the deviation amount identification unit F6. As another aspect, one deviation amount identified at any one time point may be adopted as the correction amount as it is.

The correction amount calculated by the correction amount calculation unit F10 is stored in the correction data storage M1. The corrected map creation unit F9 creates the corrected map data with the use of the correction amount stored in the correction data storage M1, and provides the corrected map data thus created to a predetermined application, similarly to the embodiment described above.

According to the configuration described above, the corrected map data can be provided by the vehicle unit 1 alone. The vehicle unit 1 in Modification 3 does not need to include the wide area communication unit 13.

(Modification 4)

The correction amount calculation unit F10 included in the vehicle unit 1 of Modification 3 may calculate the correction amount for a certain section with the use of the correction amount calculated for the section adjacent to the certain section. For example, the correction amount for the second section is set to a mean value of the values of the correction amounts set for the first section and the third section in each axial direction.

According to the configuration described above, when there is a section (hereinafter, an unset section) for which the deviation amount has not yet been acquired, and the correction amount for the adjacent section can be calculated, the correction amount for the unset section can be set. The method described above as Modification 4 can also be applied to the correction amount calculation unit 222 included in the center 2.

(Modification 5)

The correction amount calculation unit F10 included in the vehicle unit 1 of Modification 3 may correct and use the correction amount for each section based on an assumed value of the amount of crustal movement amount per unit period and an elapsed time from a last calculation of the correction amount. For example, when the assumed value of the amount of crustal movement per month is ($\Delta$xm, $\Delta$ym, $\Delta$zm) and there is an interval in which two months have elapsed since the last calculation of the correction amount, the correction amount in the interval is used as (dx+2×$\Delta$xm, dy+2×$\Delta$ym, dz+2×$\Delta$zm). Note that (dx, dy, dz) represents the correction amount before correction.

According to the configuration described above, the corrected map data for a section to which the subject vehicle has gone in the past and in which the subject vehicle has not traveled for a while. The method described above as Modification 5 can also be applied to the correction amount calculation unit 222 included in the center 2.

Each or a combination of the multiple units described above may be implemented (i) as units of software in combination with a hardware unit (for example, a computer), as well as (ii) as units of hardware (for example, an integrated circuit, a wired logic circuit), with or without the functionality of the associated device. Further, the hardware units can be configured inside the microcomputer.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. A map data providing system comprising:
a vehicle unit that is configured to be used with being mounted on a vehicle and includes
a map data storage that stores map data including a plurality of pieces of section data indicating position information of a plurality of map elements existing in a map recording area with dividing the map recording area into a plurality of sections, in which the map elements include an on-road installed object, which is an object installed on a road, a reference point is set in each of the sections, position information of the reference point is represented by absolute coordinates, and the position information of each of the map elements is represented by relative coordinates indicating a relative position to the reference point set in the section to which each of the map elements belongs, a vehicle position detector that detects position coordinates of the vehicle upon receiving a navigation signal transmitted by a positioning satellite, a surrounding area map data acquisition unit that reads traveling section data which is the section data of the section in which the vehicle exists based on the position coordinates detected by the vehicle position detector, and acquires surrounding area map data which is data indicating the position coordinates of the map elements existing around the vehicle based on the position information of the reference point set in a traveling section which is the section in which the vehicle exists and the relative coordinates of each of the map elements indicated by the traveling section data, a deviation amount identification unit that identifies a deviation amount indicating a difference between a position of each of the map elements indicated in the traveling section data and a position at which each of the map elements actually exists, based on the position coordinates detected by the vehicle position detector, a surrounding information acquisition unit that acquires a detection result of a surrounding monitoring system mounted on the vehicle, the surrounding information acquisition unit detecting the on-road installed object existing in a surrounding of the vehicle and identifying a relative position of a detected object, which is the detected on-road installed object, to the vehicle, and a detected object coordinate identification unit that identifies absolute coordinates of the detected object based on the relative position of the detected object acquired by the surrounding information acquisition unit and the position coordinates of the vehicle detected by the vehicle position detector;

a correction amount calculation unit that calculates a correction amount for adjusting the coordinates of the reference point indicated in the traveling section data to an actual position based on the deviation amount identified by the deviation amount identification unit; and a corrected map creation unit that corrects the position information of the reference point by using the correction amount determined by the correction amount calculation unit, and creates corrected map data indicating the position coordinates of each of the map elements by using the corrected position information of the reference point and the relative coordinates of each of the map elements, wherein the deviation amount identification unit identifies absolute coordinates of the detected object indicated by the map data, based on the surrounding area map data acquired by the surrounding area map data acquisition unit, the deviation amount identification unit employs a difference between the identified coordinates of the detected object on the map data and the coordinates of the detected object identified by the detected object coordinate identification unit as the deviation amount, the vehicle unit further includes an on-map vehicle position identification unit that identifies an on-map vehicle position, which is a position of the vehicle on the map data, based on data obtained by arraying detection results of the vehicle position detectors in time series order, and the deviation amount identification unit calculates a difference between the position coordinates of the on-map vehicle position identified by the on-map vehicle position identification unit, which is described in the map data, and the detection results of the vehicle position detector, and employs the calculated difference as the deviation amount.

2. The map data providing system according to claim 1, wherein the position coordinates of the reference point is represented by a predetermined three-dimensional coordinate system, each of the deviation amount and the correction amount is represented by using a value for each axial direction configuring the three-dimensional coordinate system, and the correction amount calculation unit calculates a mean value or a median value of a plurality of the deviation amounts calculated for one section as a population, or a value for each axial direction corresponding to a center of gravity of the plurality of deviation amounts, and employs the calculated value for each axial direction as the correction amount.

3. The map data providing system according to claim 2, wherein the deviation amount identification unit provides accuracy index information indicating a detection accuracy of the position coordinates of the vehicle used for identifying the deviation amount to the correction amount calculation unit in association with the deviation amount, and the correction amount calculation unit calculates the correction amount preferentially using the deviation amount associated with the accuracy index information indicating a high detection accuracy among a plurality of the deviation amounts.

4. The map data providing system according to claim 1, further comprising:

one or more of the vehicle units; and a center that communicates with each of the vehicle units through a wide area communication network; wherein each of the vehicle units further includes:

a vehicle-side corrected map creation unit as the corrected map creation unit;

a deviation amount data transmission unit that transmits the deviation amount identified by the deviation amount identification unit to the center in association with section information indicating the traveling section; and a data acquisition unit that acquires a data transmitted from the center, and the center includes:

a wide area communication unit for receiving the deviation amount transmitted from the deviation amount data transmission unit and transmitting data to each of the vehicle units; and the correction amount calculation unit that calculates the correction amount for each of the sections based on the deviation amount received by the wide area communication unit, the center distributes the correction amount determined by the correction amount calculation unit, the data acquisition unit acquires the correction amount distributed from the center, and the vehicle-side corrected map creation unit creates the corrected map data by using the correction amount distributed from the center.

5. The map data providing system according to claim 4, wherein when the correction amount calculation unit acquires the plurality of deviation amounts for a same section from the plurality of vehicle units, the correction amount calculation unit calculates the correction amount of the position information of the reference point set in the same section using the plurality of correction amounts as a population.

6. The map data providing system according to claim 4, further comprising a map use terminal that is configured to be able to communicate with the center through the wide area communication network, wherein the center further includes a center-side corrected map creation unit as the corrected map creation unit, and the wide area communication unit distributes the corrected map data created by the center-side corrected map creation unit to the map use terminal.

7. A map data providing system comprising a vehicle unit configured to be mounted in a vehicle and including a map data storage and a vehicle-side controller, wherein the map data storage stores map data including a plurality of pieces of section data indicating position information of a plurality of map elements existing in a map recording area with dividing the map recording area into a plurality of sections in which the map elements include an on-road installed object, which is an object installed on a road, a reference point is set in each of the sections, position information of the reference point is represented by absolute coordinates, and the position information of each of the map elements is represented by relative coordinates indicating a relative position to the reference point set in the section to which each of the map elements belongs, the vehicle-side controller includes a processor and a memory storing a vehicle program, the vehicle program instructs the processor to:

detect position coordinates of the vehicle upon receiving a navigation signal transmitted by a positioning satellite;

read traveling section data which is the section data of the section in which the vehicle exists based on the position coordinates;

acquire surrounding area map data which is data indicating the position coordinates of the map elements existing around the vehicle based on the position information of the reference point set in a traveling section which is the section in which the vehicle exists and the relative coordinates of each of the map elements indicated by the traveling section data;

acquire a detection result of a surrounding monitoring system mounted on the vehicle, detect the on-road installed object existing in a surrounding of the vehicle and identify a relative position of a detected object, which is the detected on-road installed object, to the vehicle;

identify absolute coordinates of the detected object based on the relative position of the detected object and the position coordinates of the vehicle;

identify absolute coordinates of the detected object indicated by the map data based on the surrounding area map data;

employ a difference between the absolute coordinates of the detected object indicated by the map data and the absolute coordinates of the detected object identified based on the relative position of the detected object and the position coordinates of the vehicle as a deviation amount;

calculate a correction amount for adjusting the coordinates of the reference point indicated in the traveling section data to an actual position based on the deviation amount;

correct the position information of the reference point by using the correction amount, and create corrected map data indicating the position coordinates of each of the map elements by using the corrected position information of the reference point and the relative coordinates of each of the map elements;

identify an on-map vehicle position, which is a position of the vehicle on the map data, based on data obtained by arraying detection results of the position coordinates in time series order; and calculate a difference between the position coordinates of the on-map vehicle position which is described in the map data, and the detection results of the position coordinates and employs the calculated difference as the deviation amount.

8. A map data providing system comprising:

a vehicle unit configured to be mounted in a vehicle and including a map data storage and a vehicle-side controller; and a center that communicates with the vehicle unit through a wide area communication network and includes a center-side controller, wherein the map data storage stores map data including a plurality of pieces of section data indicating position information of map elements existing in a map recording area with dividing the map recording area into a plurality of sections in which the map elements include an on-road installed object, which is an object installed on a road, a reference point is set in each of the plurality of sections, position information of the reference point is represented by absolute coordinates, and the position information of each of the map elements is represented by relative coordinates indicating a relative position to the reference point set in the section to which each of the map elements belongs, the vehicle-side controller includes a processor and a memory storing a vehicle program, the vehicle program instructs the processor in the vehicle-side controller to:

detect position coordinates of the vehicle upon receiving a navigation signal transmitted by a positioning satellite;

read traveling section data which is the section data of the section in which the vehicle exists based on the position coordinates;

acquire surrounding area map data which is data indicating the position coordinates of the map elements existing around the vehicle based on the position information of the reference point set in a traveling section which is the section in which the vehicle exists and the relative coordinates of each of the map elements indicated by the traveling section data;

acquire a detection result of a surrounding monitoring system mounted on the vehicle, detect the on-road installed object existing in a surrounding of the vehicle and identify a relative position of a detected object, which is the detected on-road installed object, to the vehicle;

identify absolute coordinates of the detected object based on the relative position of the detected object and the position coordinates of the vehicle;

identify absolute coordinates of the detected object indicated by the map data based on the surrounding area map data;

employ a difference between the absolute coordinates of the detected object indicated by the map data and the absolute coordinates of the detected object identified based on the relative position of the detected object and the position coordinates of the vehicle as a deviation amount;

transmit the deviation amount to the center in association with section information indicating the traveling section;

identify an on-map vehicle position, which is a position of the vehicle on the map data, based on data obtained by arraying detection results of the position coordinates in time series order; and calculate a difference between the position coordinates of the on-map vehicle position which is described in the map data, and the detection results of the position coordinates and employs the calculated difference as the deviation amount;

the center-side controller includes a processor and a memory storing a center program, the center program instructs the processor in the center-side controller to:

receive the deviation amount transmitted from the vehicle unit; and calculate a correction amount for adjusting the coordinates of the reference point indicated in the traveling section data to an actual position based on the deviation amount, the vehicle program instructs the processor in the vehicle-side controller or the center program instructs the processor in the center-side controller to:

acquire the correction amount and correct the position information of the reference point by using the correction amount; and create corrected map data indicating the position coordinates of each of the map elements by using the corrected position information of the reference point and the relative coordinates of each of the map elements.

* * * * *